United States Patent
Wuest et al.

(10) Patent No.: US 11,007,576 B2
(45) Date of Patent: May 18, 2021

(54) IRRADIATING A MACHINING FIELD

(71) Applicant: TRUMPF Laser- und Systemtechnik GmbH, Ditzingen (DE)

(72) Inventors: Frank Peter Wuest, Herrenberg (DE); Frederik Schaal, Fellbach (DE); Matthias Allenberg-Rabe, Stuttgart (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 69 days.

(21) Appl. No.: 16/419,249

(22) Filed: May 22, 2019

(65) Prior Publication Data

US 2019/0270139 A1 Sep. 5, 2019

Related U.S. Application Data

(63) Continuation of application No. PCT/EP2017/078811, filed on Nov. 9, 2017.

(30) Foreign Application Priority Data

Nov. 23, 2016 (DE) .......................... 102016223215.0

(51) Int. Cl.
  B29C 67/00 (2017.01)
  B22F 12/00 (2021.01)
  (Continued)

(52) U.S. Cl.
  CPC ............ B22F 12/00 (2021.01); B23K 26/034 (2013.01); B29C 64/20 (2017.08); B33Y 30/00 (2014.12);
  (Continued)

(58) Field of Classification Search
  CPC ....... B33Y 30/00; B33Y 10/00; B22F 3/1055; B22F 2003/1056; B29C 43/20; B29C 43/264
  See application file for complete search history.

(56) References Cited

U.S. PATENT DOCUMENTS 5,427,733 A  6/1995 Benda
6,177,649 B1  1/2001 Juret et al.
(Continued)

FOREIGN PATENT DOCUMENTS

CN  1135732  11/1996
CN  101065649  10/2007
(Continued)

OTHER PUBLICATIONS

International Search Report and Written Opinion for International Application No. PCT/EP2017/078811 dated Mar. 21, 2018.
(Continued)

*Primary Examiner* — Thu Khanh T Nguyen
(74) *Attorney, Agent, or Firm* — Fish & Richardson P.C.

(57) ABSTRACT

An irradiating device for irradiating a machining field with a machining beam, in particular with a laser beam, for carrying out a welding process, is provided. The irradiating device includes a beam scanner for aligning the machining beam to a machining position in the machining field. The irradiating device has an imaging device for imaging a part-region of the machining field on a pyrometer which has at least two pyrometer segments. The imaging device images thermal radiation which emanates from the machining position in the machining field on a first pyrometer segment, and images thermal radiation which emanates from a position in the machining field being situated ahead of or behind the machining position along an advancing direction of the machining beam in the machining field on at least one (Continued)

second pyrometer segment. A machine tool having such an irradiating device is also provided.

25 Claims, 2 Drawing Sheets

(51) Int. Cl.
*B33Y 30/00* (2015.01)
*B23K 26/03* (2006.01)
*G01J 5/20* (2006.01)
*G01J 5/60* (2006.01)
*G01J 5/00* (2006.01)
*B29C 64/20* (2017.01)
*B22F 10/10* (2021.01)
*B29C 64/264* (2017.01)

(52) U.S. Cl.
CPC ............... *G01J 5/004* (2013.01); *G01J 5/20* (2013.01); *G01J 5/602* (2013.01); *B22F 10/10* (2021.01); *B22F 2999/00* (2013.01); *B29C 64/264* (2017.08); *G01J 2005/0077* (2013.01); *G01J 2005/204* (2013.01); *Y02P 10/25* (2015.11)

(56) References Cited

U.S. PATENT DOCUMENTS

| | | | |
|---|---|---|---|
| 7,717,617 B2 | 5/2010 | Adams et al. | |
| 8,777,482 B2 | 7/2014 | Pfitzner et al. | |
| 9,089,926 B2 | 7/2015 | Pfitzner et al. | |
| 9,501,821 B2 | 11/2016 | Pfitzner et al. | |
| 9,903,762 B2 | 2/2018 | Schwarze et al. | |
| 2009/0206065 A1 | 8/2009 | Kruth et al. | |
| 2010/0086003 A1* | 4/2010 | Pfitzner | B23K 26/032 374/5 |
| 2016/0074965 A1* | 3/2016 | Jakimov | B29C 64/153 219/76.12 |
| 2017/0090462 A1* | 3/2017 | Dave | B33Y 30/00 |
| 2017/0239719 A1* | 8/2017 | Buller | B33Y 30/00 |
| 2019/0217422 A1 | 7/2019 | Kramer et al. | |

FOREIGN PATENT DOCUMENTS

| | | | |
|---|---|---|---|
| CN | 101553339 | 10/2009 | |
| CN | 101730607 | 6/2010 | |
| CN | 103857490 | 6/2014 | |
| DE | 102011078276 | 12/2012 | ............. B23K 26/03 |
| DE | 102016001355 | 8/2017 | ........... B29C 64/141 |
| EP | 0 934 797 | 8/1999 | ............. B23K 26/02 |
| EP | 3 023 757 | 5/2016 | ............... G01J 5/00 |
| JP | 2005007451 | 1/2005 | |
| WO | WO 2013/021173 | 2/2013 | ............. B29C 67/00 |

OTHER PUBLICATIONS

German Office Action for German Application No. DE 10 2016 223 215.0 dated Oct. 11, 2017.
CN Office Action in Chinese Appln. No. 201780072514, dated Aug. 11, 2020, 18 pages (with English translation).
CN Search Report in Chinese Appl. No. 201780072514, dated Jul. 30, 2020, 2 pages.

* cited by examiner

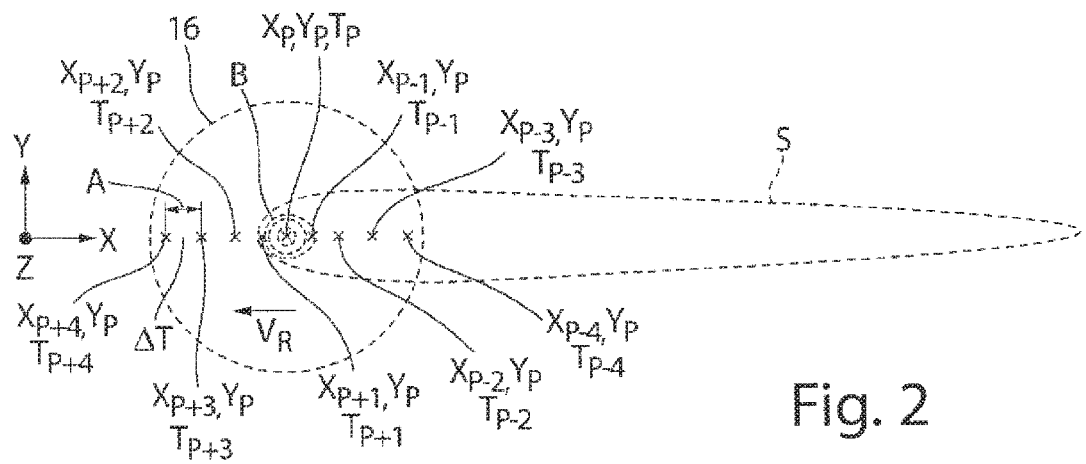
Fig. 2
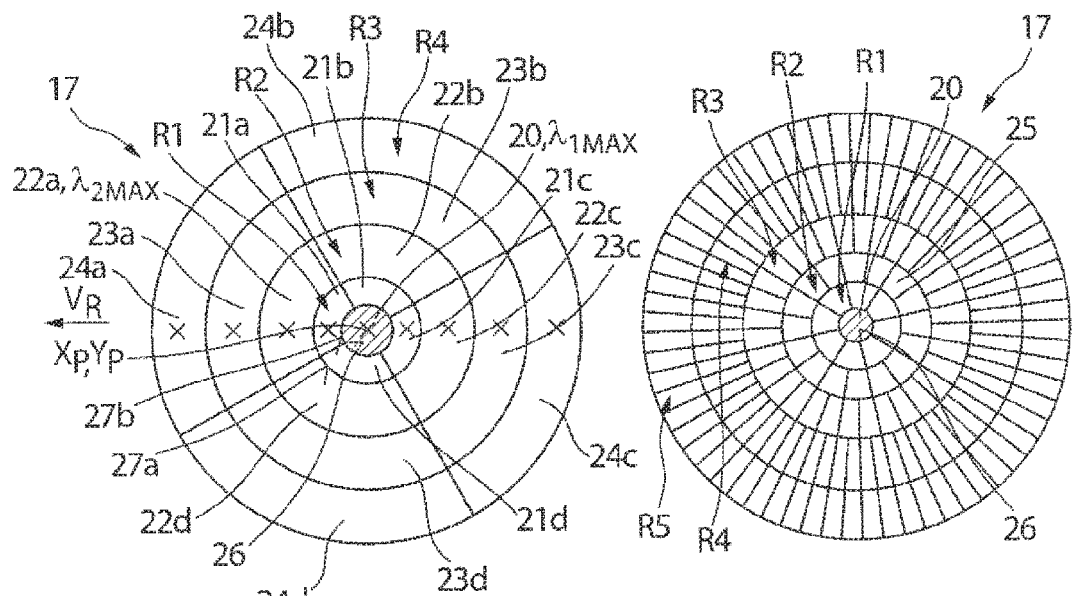
Fig. 3A
Fig. 3B
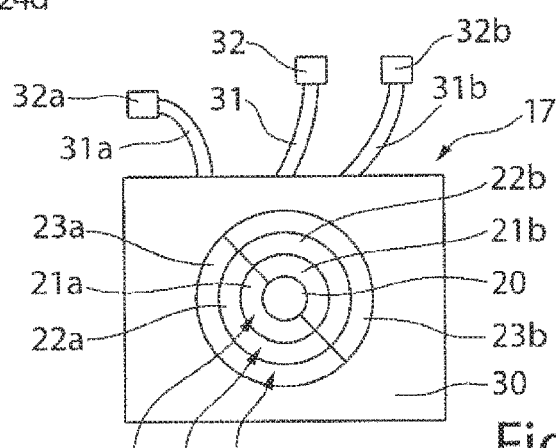
Fig. 4

IRRADIATING A MACHINING FIELD

CROSS REFERENCE TO RELATED APPLICATIONS

This application is a continuation of and claims priority under 35 U.S.C. § 120 from PCT Application No. PCT/EP2017/078811, filed on Nov. 9, 2017, which claims priority from German Application No. 10 2016 223 215.0, filed on Nov. 23, 2016. The entire contents of each of these priority applications are incorporated herein by reference.

TECHNICAL FIELD

The present invention relates to an irradiating device for irradiating a machining field with a machining beam, in particular with a laser beam, for carrying out a welding process, comprising a scanner device for aligning the machining beam to a machining position in the machining field. The invention also relates to an associated machine tool for producing three-dimensional components by irradiating powder layers by means of a machining beam, in particular by means of a laser beam, wherein the machine tool has an irradiating device, as described further above, for irradiating the powder layers in a machining field.

BACKGROUND

For quality monitoring and closed-loop controlling a process for producing three-dimensional components by irradiating (metallic) powder layers which are fused layer-by-layer with a machining beam, for example with a laser beam (laser metal fusion—LMF), it is necessary for the melting process, or the welding process, respectively, in particular the melt pool which is formed in the LMF process, to be monitored. The most important key indicators to this end are the temperatures and the temperature gradients when melting and solidifying the melt, since said temperatures and temperature gradients determine the substantial properties of the components. No differentiation is made in the present application between a welding process and a sintering process; rather, a welding process is also to be understood to be a sintering process.

These key indicators can only be insufficiently detected using conventional sensors in the form of pyrometers or in the form of cameras for monitoring temperatures. Pyrometers are optical temperature measurement apparatuses which capture thermal radiation by means of which the temperature can be determined. To this end, the thermal radiation from an observation plane, in the present case the machining plane, is imaged by way of an optical imaging on a sensor element, more specifically on a sensor surface of the pyrometer. Diodes which detect only one measurement point, or only one position in the machining plane, respectively, and which have a high sensitivity, measuring dynamic, and measuring rate are usually used as sensor elements, or as pyrometers, respectively. For example, in the case of pyrometers of this type, part of the machining plane, or a measurement spot having a diameter of 1 mm, respectively, can be imaged on a diode, wherein the spatial resolution, or the measurement spot, respectively, in this case is significantly larger than the focal spot (50 to 100 µm). Cameras which typically form a Cartesian sensor array are used for planar detection. Said cameras have a high spatial resolution but only a low measuring rate, measuring dynamic, and sensitivity.

For process monitoring of an LMF process, measuring rates in the range of 100 kHz are required on account of the high advancing speeds in the range of several m/s. The measuring dynamic required is derived from the difference between the temperature of the component (~200° C.) and the temperature of the liquid melt (~2000° C.). Low temperatures, on account of the low intensity of the thermal radiation, are more difficult to detect with the aid of pyrometrics than high temperatures. The entire temperature profile of the welding process around the machining position can therefore not or only insufficiently be detected by means of a camera. Therefore, existing methods are concentrated on the melt pool temperature and the melt pool geometry which, by virtue of the high temperatures, are easier to detect than regions outside the melt pool, this however typically not being sufficient for any meaningful closed-loop control of the process. Camera-based sensors, which however cannot be applied to the high measuring rates for the LMF process, are known for processes having low advancing speeds (for example, laser welding).

A method and a device for selectively combining particular material in which radiation is used for sintering a part-region of a layered material and for in this way generating a three-dimensional body are known from WO 2013/021173 A1. In one exemplary embodiment, a sensor is used for determining the temperature of the sintered part-region. The sensor can be an infrared camera, a single pyrometer, or an array of pyrometers. A plurality of radiation sources can serve for providing the radiation. A filter, or a plurality of filters, can also be provided so as to filter the radiation that is generated by at least some of the plurality of radiation sources.

A pyrometric detection device for use in a device for producing three-dimensional workpieces, wherein the detection device is configured for capturing thermal radiation, is known from EP 3 023 757 A1. The pyrometric detection device can have a first optical sensor and a second optical sensor, wherein the first and the second optical sensor are configured for emitting an electrical signal which depends on an intensity of the thermal radiation in a specific wavelength range. Optical filters and/or wavelength-dependent beam splitters can be used for directing the incident thermal radiation in the desired wavelength range to a respective detector. A value indicating the temperature at the location of emission can be calculated in that a ratio between the electrical signal of the first optical sensor and the electrical signal of the second optical sensor is taken into account.

SUMMARY

The invention is based on one of objects of providing an irradiating device and a machine tool having such an irradiating device, said irradiating device and said machine tool enabling improved monitoring of the welding process.

One aspect of the invention features an irradiating device of the type mentioned at the outset, furthermore comprising an imaging device for imaging a part-region of the machining field on a pyrometer which has at least two pyrometer segments, wherein the imaging device images thermal radiation which emanates from the machining position in the machining field on a first pyrometer segment, and wherein the imaging device images thermal radiation which emanates from a position in the machining field being situated ahead of or behind the machining position along an advancing direction of the machining beam in the machining field on at least one second pyrometer segment. The imaging device can optionally form part of the pyrometer, but this is not mandatory. The imaging device in the simplest case is a lens.

The pyrometer used in the case of the irradiating device described here has at least two pyrometer segments, specifically and typically a first pyrometer segment as well as a plurality of second pyrometer segments which enable the contactless detection of the temperature at a plurality of positions in the machining field and, by virtue of the high measuring rate of more than approx. 100 kHz required, enable the monitoring of the welding process in real time. For this purpose, the imaging device images a part-region of the machining field which includes the momentary machining position, or the focal spot, respectively, on the pyrometer. The imaged, not mandatorily circular, part-region of the machining field can have a diameter from approx. 2 to approx. 10 mm, for example. The imaging device has optical components or coatings, respectively, which have a transmission that is sufficient for the wavelength range that is detected by the pyrometer, typically the NIR wavelength range. The imaging device should moreover be configured for reducing field-dependent and chromatic aberrations. The entire incident thermal radiation is integrally detected at one respective pyrometer segment, that is to say a respective pyrometer segment represents a planar region where the thermal radiation can be detected so as not to be typically spatially resolved.

With the aid of the pyrometer described further above, the temperatures in the environment of the machining beam stated hereunder can in particular be detected. The powder temperature in the advancing direction ahead of the machining position, and thus the powder heating, or the heating of the component, respectively, the temperature gradient when melting the powder, said temperature gradient being characteristic in terms of the effective power of the machining beam, for example a laser beam, during the process, as well as the cooling rate (microstructure of the structure, material properties, inherent stresses, etc.). In the case of a sufficiently large number of second pyrometer segments, temperatures or temperature gradients, respectively, in the environment of the machining beam can be determined not only along the advancing direction but also in other directions, for example transversely to the advancing direction. For example, in the planar melting of the powder bed, in which a plurality of thermal tracks are generated which run so as to neighbor and be parallel to one another with the aid of second pyrometer segments which extend substantially laterally in relation to the advancing direction, thermal radiation from the not yet fully cooled neighboring thermal tracks can also be detected or imaged, respectively, in addition to an evaluation of the momentarily generated thermal track. In this way, temperature gradients, or the cooling rate also in the neighboring most recently irradiated thermal tracks, respectively, can be detected, that is to say over longer temporal periods than in the direct run-up to or run-off from the machining position, respectively. The pyrometer, or the irradiating device, described here, can be used not only for the monitoring of welding processes in machine tools for producing three-dimensional components, but also in other welding processes, for example in laser welding processes, for machining in particular plate-shaped metallic workpieces, or for the monitoring of other high-temperature processes.

In one embodiment, the first pyrometer segment and the at least one second pyrometer segment are formed on the surface of a segmented diode, or the first pyrometer segment and the at least one second pyrometer segment are connected to a detector by way of a respective radiation transporting device. By using pyrometers configured in the manner described here for the detection of the thermal radiation, the latter can be detected at a higher measuring rate, measuring dynamic, and sensitivity than in the case of a camera. The pyrometer segments can be implemented on a segmented diode in that the surface of the diode is subdivided into different electrically isolated segments. Known micro structuring processes for the production of diodes can be used for the subdividing, for example in a manner analogous to that in the production of quadrant diodes. In this case, the electrical contact can be guided to the periphery of the diode by thin conductor tracks, and from there to a printed circuit or to a housing by means of wire bonds. Contacting the rear side of the diode enables a common anode or cathode to be implemented. The respective signals of the pyrometer segments of the segmented diode can be digitalized by respective A-D converters and be relayed to an evaluation unit/closed-loop control unit. Numerous and complexly shaped diode segments or pyrometer segments, respectively, can be produced with the aid of micro structuring the diode surface when using a segmented diode. In order for the light sensitivity of the pyrometer segments to be maximized and for the evaluation device to be relieved, the number of the pyrometer segments should however not be chosen so as to be excessive.

As an alternative to the implementation of the pyrometer segments on the surface of a segmented diode, the pyrometer segments can be disposed on a common base plate and connected to a diode or to another heat-sensitive sensor by way of a respective radiation transporting device. In this case, a spatially separated collection of the thermal radiation by means of a plurality of radiation transporting devices in the form of geometrically suitably disposed light-guiding cones, based for example on reflection, total reflection, refraction, or diffraction optics, toward conventional diodes or to other heat-sensitive sensors can be performed. The pyrometer segments can optionally form the ends of suitably disposed optical waveguides which are shaped in a geometrically suitable manner and which are disposed on a common base plate and serve for the spatially separated collection and relaying of the thermal radiation to fiber-coupled (standard) diodes or other thermally conducting sensors.

In order for the temperatures in a welding process, especially in an LMF process, to be detected, it has proven favorable for (a) structured diode(s), or conventional diodes, respectively, having sensitivities in the wavelength range from 1.5 μm to 2.2 μm to be used, for example InGaAs diodes.

In one further embodiment, the irradiating device additionally comprises a filter device for the in particular wavelength-dependent attenuation of the intensity of the thermal radiation that emanates from the machining field, said filter device being disposed between the machining field and the first pyrometer segment and/or at least one second pyrometer segment. The use of a wavelength-selective filter device which reduces the intensity of the thermal radiation before the latter meets the first pyrometer segment enables the thermal radiation at the machining position to be detected directly by the first pyrometer segment. Further filter devices which typically attenuate the thermal radiation to a lesser degree, in order for the thermal radiation of material that cools or is yet to be welded to be detected, can optionally be disposed between the at least one second pyrometer segment and the machining field. It is understood that a filter device for filtering the thermal radiation does not necessarily have to be used in particular in the case of the second pyrometer segments. The necessary measuring dynamic for the temperature range between approx. 300° C. and approx. 2000° C. can be implemented in a favorable manner by using filter devices for filtering the thermal radiation, said filter devices being assigned individually to individual pyrometer segments.

The filter device for an individual pyrometer segment can be configured as a wavelength-dependent bandpass filter. The bandpass filter can in particular be permeable for at least two different wavelengths such that the thermal radiation can be detected in the case of at least two wavelengths that sufficiently differ from one another. This is favorable since the absolute temperature in the case of the single-wavelength pyrometry, in which the thermal radiation is determined at substantially one wavelength, can only be determined based on the knowledge of the emissivity of the workpiece. Since phase transformations (powder, melt, solidification) take place in the LMF process, the respective emissivity is typically unknown. The temperature can be determined without an emissivity constant by way of the multi-wavelength pyrometry. Multi-wavelength pyrometers are usually implemented by splitting the observation beam path with the aid of bandpass beam splitters. In the case of the pyrometer proposed here, the filter device(s) in the case of pyrometer segments which are formed on the surface of a diode, or optionally a common base plate, can be implemented by applying a coating directly to the pyrometer segments. In the case of a suitable design of the properties of the respective filter device, the thermal radiation, or the respective signal, respectively, per pyrometer segment, or per measurement point, respectively, can therefore be captured at multiple wavelengths so as to enable a direct determination of the temperature.

In one further embodiment, at least two of the pyrometer segments on the surface of the structured diode, or at least two of the detectors that by way of a respective radiation transporting device are connected to different pyrometer segments, in particular in the form of diodes, have a different wavelength-dependent sensitivity in relation to the thermal radiation which emanates from the machining field. The pyrometer segments per se, or the detectors which are connected to a respective pyrometer segment, in particular in the form of diodes, can be produced from different materials which have in each case a different wavelength-dependent sensitivity in relation to the incident thermal radiation. In particular, the detectors, or the pyrometer segments of the structured diode, respectively, can have in each case a different maximum wavelength at which the sensitivity in relation to the incident thermal radiation is at the maximum. This is favorable since the temperature range in which thermal radiation is to be detected lies between approx. 200° C. and approx. 2000° C., as has been described above, this corresponding to a displacement of the emission maximum of the thermal radiation of approx. 1-5 µm. Adapting the material of the detector, or of the diode, or of the pyrometer segments of the segmented diode, respectively, to the wavelength of the emission maximum of the thermal radiation which is imaged on the respective associated pyrometer segment can significantly improve the signal quality in the detection of the thermal radiation. It can be exploited herein that diodes, depending on the type of the (semiconductor) material used, have a different wavelength-dependent sensitivity. When the pyrometer segments are formed on the surface of a segmented diode, different semiconductor materials in the form of diode plates can be bonded to one another. When the pyrometer segments are disposed on a common surface and are connected by way of a respective radiation transporting device, for example in the form of optical waveguides, to a respective detector, detector types having different wavelength-dependent sensitivity, or different types of diodes, or different diode materials, respectively, can be used.

In one refinement, the first pyrometer segment of the structured diode, or the detector which is connected to the first pyrometer segment, has a maximum sensitivity at a maximum wavelength which is less than the maximum wavelength of at least one of the second pyrometer segments of the structured diode, or of at least one detector which is connected to a second pyrometer segment. As has been described further above, temperature radiation from different temperature ranges is imaged on different pyrometer segments, depending on the disposal of the latter on the pyrometer surface. Thermal radiation having the highest temperatures and thus having an emission maximum at the shortest wavelengths is imaged on the first pyrometer segment. It is therefore favorable for the maximum wavelength of the first pyrometer segment, or of the detector which is connected thereto, respectively, to be smaller than the maximum wavelength(s) of the second pyrometer segments. In the case of the second pyrometer segments being disposed in a plurality of annular segments about the central first pyrometer segment, the temperature of the incident thermal radiation decreases as the spacing from the central first pyrometer segment increases. Alternatively or additionally to the measure described above, it can accordingly be favorable for materials in the case of which the maximum wavelength lies at comparatively large wavelengths to be used for second pyrometer segments which are disposed in a further outward annular region than in the case of second pyrometer segments which are disposed in a further inward annular region.

In a further embodiment, the first pyrometer segment and/or the second pyrometer segment have/has an external contour having at least one curved, in particular arcuate, edge. As has been described further above, the pyrometer segments can deviate from a rectangular or square geometry, respectively, in order for the detection of the thermal radiation to be improved. In this way, the number of pyrometer segments per unit area and the evaluation device, or the evaluation electronics, respectively, can be designed in such a manner that pyrometer data for the LMF process is generated at a sufficiently high measuring rate, dynamic, sensitivity, and spatial resolution. The data rate can additionally also be reduced in this way.

In one further embodiment the first pyrometer segment is circular. This is favorable for being able to detect only the thermal radiation of the typically likewise circular focal spot. The imaging device is typically configured in such a manner that the dimension, or the diameter, respectively, of the focal spot (while taking into consideration the imaging scale) corresponds approximately to the diameter of the first pyrometer segment. It is achieved in this way that the second pyrometer segments can detect the thermal radiation outside the focal spot.

In one further embodiment the pyrometer has at least two second pyrometer segments which are configured as annular segments. In the case of a welding process, in particular in the case of an LMF process, the machining beam is repositioned or rotated, respectively, in all directions in the machining plane such that the thermal track, or the melt pool, respectively, rotates in the field of view, that is to say in the part-region of the machining field that is imaged by means of the imaging device. In order to differentiate between thermal radiation which emanates from a position that is ahead of the machining position in the machining direction, and thermal radiation which emanates from a position that is behind the machining position in the machining direction, a discrimination of the pyrometer segments by 180° is sufficient, as long as the relocation path in the field of view of the pyrometer can be assumed to be approximately linear, that is to say that it is sufficient for two annular segments which in the circumferential direction extend in each case across an angular range of approx. 180° and are directly mutually contiguous to be used. However, to the extent that the advancing direction is congruent with the separation web, or the border, respectively, between the two pyrometer segments, this procedure leads to the two directly neighboring annular pyrometer segments being both impinged with thermal radiation, this falsifying the measurement result.

In order for a reliable discrimination in terms of the thermal radiation which emanates from a position ahead of the machining position and thermal radiation which emanates from a position behind the machining position to be performed, at least three pyrometer segments are therefore required, said pyrometer segments potentially being configured as annular regions, for example, which extend across an angular range of approx. 120°; however, four pyrometer segments which extend across an angular range of approx. 90° can also be used. A comparatively high number of pyrometer segments or zones, respectively, enables a comparatively high spatial separation or resolution, respectively, and thus also the separation of the temperature signatures of thermal tracks which are generated in the LMF process and run so as to neighbor the momentarily generated thermal track and which are not yet sufficiently intensely cooled so that said thermal tracks likewise emit thermal radiation. In the design of the layout and the number of segments of the pyrometer, a balance has to be found between spatial resolution, sensitivity, and complexity of the evaluation.

In the case of an LMF process, the powder bed, or the powder layer, respectively, can also be heated ahead of the machining position, or the focal spot, respectively, when a melting process occurred in the powder layer lying there below, or because the machining chamber is preheated to an ideally high temperature so as to generate ideally low stresses in the three-dimensional component to be produced. On account of the differentiation between thermal radiation which emanates from a position ahead of the machining position and a position behind the machining position, both the temperature in the powder bed prior to the process, or ahead of the machining position, respectively, as well as the temperature or the cooling rate, respectively, after the process, that is to say behind the machining position, can be determined.

In one further embodiment, the second pyrometer segments which are configured as annular segments are disposed so as to be rotationally symmetrical about the first pyrometer segment. As has been described further above, the thermal track in LMF processes rotates in all directions such that a rotationally symmetrical disposal of the pyrometer segments is advantageous. Since the machining position, or the focal spot, respectively, is typically imaged at all times on the first pyrometer segment which is disposed so as to be locationally fixed in the center of the pyrometer or the pyrometer face on which the pyrometer segments are formed, respectively, the geometry and the area of the melt pool can inter alia be determined by means of the surrounding second pyrometer segments. On account of the high temperature in the focal spot and of the intense thermal signal resulting therefrom, the second pyrometer segments in this case can also be configured so as to have a comparatively small surface area.

In one further embodiment, the second pyrometer segments are disposed in a plurality of concentric rings. The use of a plurality of concentric rings enables the thermal radiation, or the temperature, respectively, at a plurality of positions that are disposed at different spacings from the machining position to be determined within the machining field, and on account thereof the spatial resolution in the determination of the temperature of the temperature gradients, respectively, to be increased.

In one embodiment, the pyrometer is disposed in an observation beam path which runs so as to be coaxial with the machining beam, that is to say that the observation beam path and the machining beam run so as to be mutually coaxial (and in opposing directions) until the observation beam path is coupled out from the machining beam. The coupling out can be performed, for example, at a beam splitter, wherein the beam splitter is typically disposed between the scanner device and the pyrometer. In this way, the observation beam path runs at all times over the scanner device, independently of the machining position to which the machining beam is aligned by the scanner device. In this way, the measurement field, that is to say the part-region of the machining field that is imaged on the pyrometer, is repositioned conjointly with the machining position, that is to say that the thermal radiation from the machining position is imaged on the first pyrometer segment independently of the machining position in the machining field.

In one further embodiment, the irradiating device comprises an open-loop and/or closed-loop control device for predefining the advancing direction in the movement of the machining beam across the machining field. As has been described further above, the machining beam by means of the scanner device is guided to different machining positions on the machining field, wherein the momentary scanning direction and thus the advancing direction in the machining field typically varies so as to be dependent on the location, specifically depending on the three-dimensional component to be produced. It is understood that the open-loop and/or closed-loop control device also controls in an open-group or closed-looped manner, respectively, other parameters of the LMF process, for example the intensity of the machining beam and thus the temperature at the machining position.

In one further embodiment, the irradiating device comprises an evaluation device which by means of the predefined advancing direction is configured for identifying second pyrometer segments which are disposed ahead of the machining position or behind the machining position in the advancing direction. As has been described further above, the machining beam in the machining field is repositioned or rotated, respectively, in all directions such that the thermal track, or the melt pool, respectively, rotates in the field of view, or in the part-region of the machining field that is imaged by means of the imaging device. In the use of second pyrometer segments which are configured as annular segments, for example, at a predefined advancing direction only a single pyrometer segment of the respective ring is typically situated ahead of the machining position in the advancing direction, and only a single annular segment is typically situated behind the machining position in the advancing direction. It is understood that optionally further second pyrometer segments can be evaluated in addition to the pyrometer segments which in the advancing direction are situated ahead of or behind the machining position, respectively, so as to determine further temperature values and to in this way increase the spatial resolution in the determination of the temperature.

In one further embodiment, the evaluation unit is configured for determining a temperature at the machining position, a temperature at a position in the machining field ahead of the machining position and/or at a position in the machining field behind the machining position, and preferably for determining at least one temperature gradient by means of at least two of the temperatures. The determination of the temperature, or of temperature gradients, respectively, enables the following additional pieces of information pertaining to the LMF process to be obtained: The powder temperature ahead of the machining position in the advancing direction, that is to say the heating of the powder, or the heating of the component, respectively, by the LMF process, the gradient when melting the powder, that is to say the effective power in the LMF process, the temperature in the melt pool (overheating), as well as the cooling rate, that is to say the microstructure of the structure, the material properties, as well as the inherent stresses of the material. These pieces of information can be used for judging the machining result (process monitoring) as well as for managing the process. For example, the powder of the machining beam, or of the laser beam, can be adapted in a timely manner by measuring the powder temperature ahead of the machining position. On account thereof, inhomogeneities in the powder preheating as well as the non-uniform heating of components (for example on account of cross-sectional variations) can be corrected. For example, the creation of inherent stresses and the homogeneity of the process can be judged by observing the cooling rate, or the entire thermal history of the component, respectively. A measurement of the local powder preheating at low temperatures of approx. 300° C. and beyond is also possible. In this way, a separation of the influences of thermal conduction, of the radiation output introduced, and of the scanning or advancing speed, respectively, can also be performed.

In one further embodiment, the open-loop and/or closed-loop control device, by means of the at least one temperature determined by the evaluation device and/or of the temperature gradient, is configured for regulating the power of the machining beam in the machining field and/or the advancing speed. As has been described further above, the output of the machining beam, for example by means of the temperature of the powder at a position ahead of the machining position of the machining beam, that is to say by means of the run-up, and/or by means of the temperature, or of a temperature gradient, respectively, behind the machining position of the machining beam, can be adapted, that is to say increased or reduced before the machining beam reaches the machining position, in order for inhomogeneities in the heating of the powder to be corrected instantaneously, that is to say in real time. Alternatively or additionally, a temperature gradient, for example in the form of the cooling rate, can be determined in order to establish how much heat is stored in the component, or in the powder bed, when melting a layer of the powder bed. Other machining parameters can be used for melting the following powder layer or tier, respectively; for example, the laser parameters, in particular the laser power, and/or the advancing speed, can be adapted in a suitable manner.

A plurality of thermal tracks which run so as to be mutually neighboring and parallel are generated in the case of planar melting of the powder bed, that is when exposing a contiguous area. In this case, pyrometer segments which extend substantially laterally in relation to the advancing direction can also detect or image, respectively, thermal radiation from the not yet fully cooled neighboring thermal tracks in addition to an evaluation of the momentarily generated thermal track. In this way, temperature gradients and/or the cooling rate can also be detected in the neighboring, last-irradiated, thermal track(s), and said pieces of information can be resorted to for the closed-loop controlling of machining parameters, for example the output of the machining laser beam and/or the advancing speed, when generating the momentary thermal track. Such closed-loop control is not performed in real time and can therefore be easily implemented.

A further aspect of the invention features a machine tool for producing three-dimensional components by irradiating powder layers by means of a machining beam, in particular by means of a laser beam, wherein the machine tool has an irradiating device as has been described further above, as well as a machining chamber having a support for applying the powder layers. The irradiating device is typically separated from the machining chamber by way of a protective glass or the like, the machining beam entering the machining chamber through said protective glass or the like. The irradiating device in relation to the machining chamber is typically disposed in such a manner that the machining field of the scanner device in which the machining beam is focused is congruent with the position of a powder layer which is to be irradiated by means of the machining beam. It is understood that the machine tool has also further construction elements which enable the application of the individual powder layers. A pressure that is reduced in relation to the environment, or a vacuum, respectively, can optionally be prevalent in the machining chamber; said machining chamber can however also be filled with an inert gas which does not react with the powder.

As has been described further above, the advancing speed, or the scanning speed, respectively, in an LMF process is very high such that the existing solutions for conventional machining processes, for example for conventional laser welding processes, having comparatively low advancing speeds, cannot be applied. For example, in the case of conventional laser welding processes a temperature measurement can be performed by increasing the measuring dynamic of the camera with the aid of multiple exposures, this not being possible by virtue of the comparatively high scanning speeds in the LMF process. In the case of an LMF process, the melt pool in the case of known solutions is rather captured with the aid of camera systems (IR or visible wavelength range) and/or with the aid of diodes. However, only the temperature and the geometry of the melt pool are determined in this way. The cooling behavior which is important in terms of the properties of the components, as well as the heating procedure of the powder cannot be measured herein, this is enabled only by the irradiating device described further above. Closed-loop controlling of the LMF process in the case of the machine tool described here can be achieved by means of the powder temperature, the temperatures when heating and/or when cooling, determined in the manner described further above. The measurement of complete temperature profiles at every position or location, respectively, of the three-dimensional component to be generated is also ideally enabled. This is achieved by way of a higher measuring dynamic, a higher sensitivity in the measurement of thermal radiation, a lower data rate by virtue of the lower number of pixels than in the case of conventional cameras, and a faster measuring rate associated therewith.

Further advantages of the invention are derived from the description and the drawing. The features mentioned above and yet further set forth can likewise be used individually or in multiples in arbitrary combinations. The embodiments shown and described are not to be understood as an exhaustive enumeration but rather have an exemplary character in order for the invention to be explained.

DESCRIPTION OF DRAWINGS

FIG. 2 shows an illustration of a part-region of the machining field having a melt pool and having a focal spot where a machining position is formed;

FIGS. 3A and 3B show illustrations of a pyrometer having a first, central, pyrometer segment and having 16, or having 199, respectively, second pyrometer segments which surround the first, central, pyrometer segment, wherein the pyrometer segments are formed on the surface of a segmented diode; and FIG. 4 shows an illustration of a pyrometer having a base plate which has a plurality of pyrometer segments, as well as having a radiation transportation device for transporting thermal radiation to a diode.

DETAILED DESCRIPTION

Figure 1:
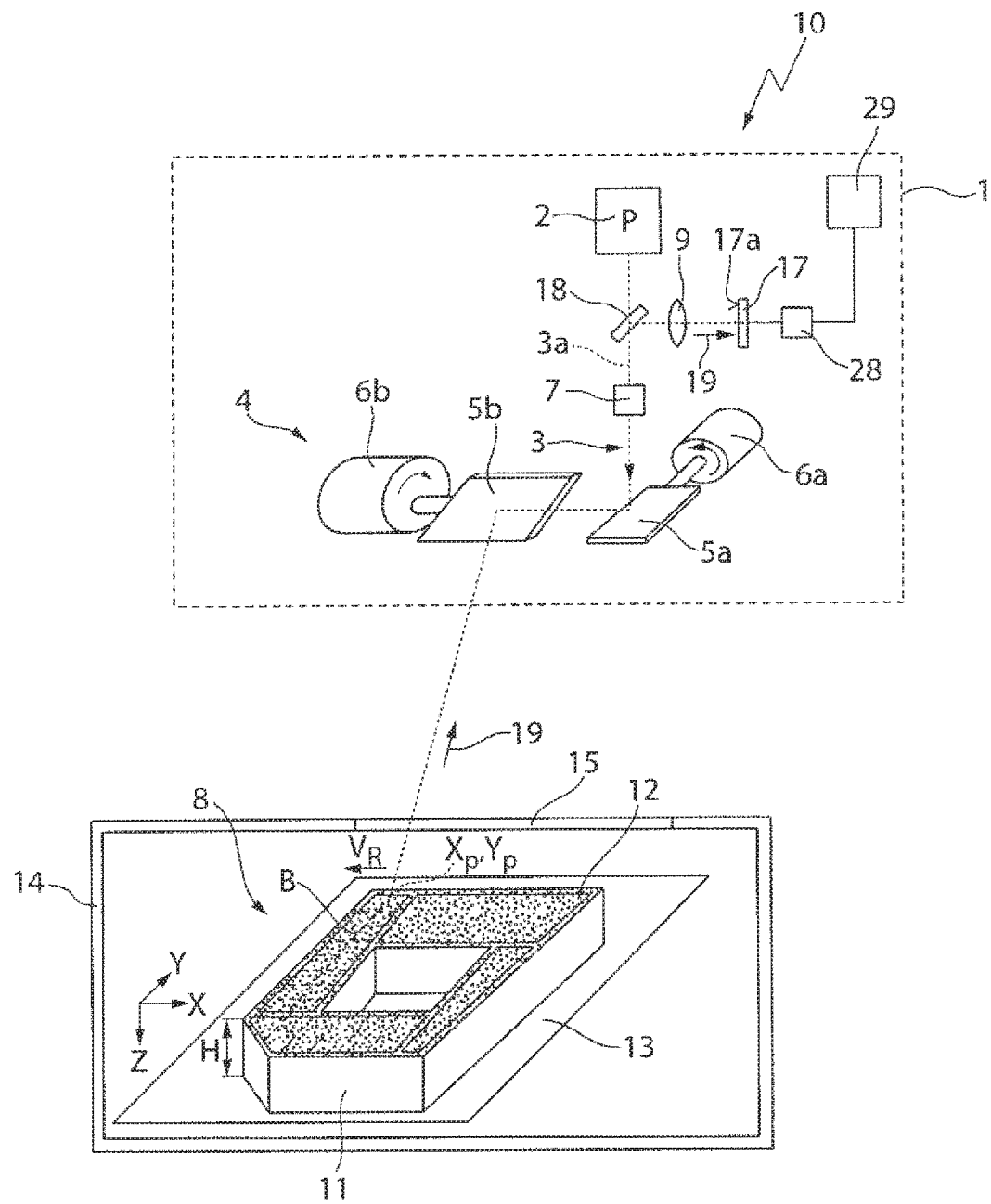
FIG. 1 shows a schematic illustration of an exemplary embodiment of a machine tool having an irradiating device for irradiating a machining field.

In the following description of the drawings, identical reference signs are used for the same or functionally equivalent components.

FIG. 1 shows an exemplary construction of an irradiating device 1 which has a radiation source 2 in the form of a laser source, for example in the form of a Nd:YAG laser or a fiber laser, for generating a machining beam in the form of a laser beam 3. A scanner device (or a beam scanner) 4 has a first and a second scanner mirror 5a, 5b which by means of associated rotary drives 6a, 6b are rotatable about two rotation axes which in the example shown coincide with the X-direction and with the Y-direction, respectively, of an XYZ coordinate system. An (adaptive) focusing device 7 is disposed in the beam path ahead of the scanner device 4, said focusing device 7 carrying out focusing of the laser beam 3 so as to focus the laser beam 3 that is deflected by the scanner device 4 in a machining field 8, as well as to align the laser beam 3 at a desired machining position XP, YP on the machining field 8.

The irradiating device 1 is part of a machine tool 10 which is used for producing three-dimensional components 11. The machining field 8 corresponds to an XY plane in which a topmost powder layer 12, shown in FIG. 1, is disposed on a powder bed that is applied to a support 13, more specifically to a support plate. The support 13 is disposed in a machining chamber 14 which has a viewing window 15 for the passage of the laser beam 3.

The (adaptive) focusing device 7 serves inter alia for aligning the beam axis Z of the laser beam 3 exiting the focusing device 7 so as to be substantially perpendicular to the XY plane or to the powder layer 12, respectively, independently of the machining position XP, YP on the machining field 8 which in the case of a suitable positioning of the irradiating device 1 coincides with the XY plane of the powder layer 12 that is disposed at a predefined height H above the support 13. It is understood that the powder layer 12, other than is shown in FIG. 1, is not limited only to the upper side of the already completed part of the three-dimensional component 11, but rather forms the topmost layer of a powder bed which extends across the entire upper side of the support 13 up to the height H. Alternatively or additionally to the focusing device 7, an F/theta lens assembly can also be used for aligning the laser beam 3 so as to be substantially perpendicular to the XY plane.

The powder layer 12, more specifically the region of the powder layer 12 that is shown in FIG. 1, which for the production of an additional layer of the three-dimensional component 11 is to be irradiated and which therefore coincides with the geometry of the component 11 to be produced, in the case of the example shown in FIG. 1 is divided by the machine tool 10, for example by an open-loop and/or closed-loop control device (or controller) 29 of the irradiating device 1, into four planar part-regions shown in FIG. 1 and into a further part-region which includes substantially the internal and external contour lines of the component 11 at the respective height H as well as further inward contour lines which mutually separate the four planar part-regions at the respective height H.

As is indicated in FIG. 1, the laser beam 3 in the machining field 8 is moved along an advancing direction $V_R$, or a scanning direction, respectively, which in the example shown corresponds to the negative X-direction. Thermal radiation 19 which emanates from a circular part-region 16 of the machining field 8, said part-region 16 being illustrated in FIG. 2, is imaged on a pyrometer 17 shown in FIG. 1 by an imaging device in the form of a relay optical system 9, for example in the form of a lens assembly which for simplification is illustrated as a lens in FIG. 1. The beam path of the laser beam 3 is passed by the thermal radiation 19 in the opposite direction along an observation beam path 3a, and the thermal radiation 19 is coupled out from the beam path of the laser beam 3 at a beam splitter mirror 18. The pyrometer 17 is disposed so as to be centric in the observation beam path 3a of the thermal radiation 19 such that the imaging device 9 images thermal radiation 19, which emanates from the machining position XP, YP in the part-region 16, on a first, circular, pyrometer segment 20 of the pyrometer 17 shown in a plan view in FIG. 3A.

The first pyrometer segment 20 is surrounded by a plurality of second pyrometer segments 21a-d, 22a-d, 23a-d, 24a-d which are disposed in four concentric rings R1 to R4 about the first pyrometer segment 20. The part-region 16 of the machining field 8 shown in FIG. 2 is imaged with the aid of the imaging device on the circular area that is covered by the first and the second pyrometer segments 20, 21a-d, 22a-d, 23a-d, 24a-d of the pyrometer 17. The imaging scale herein is chosen in such a manner that the diameter of the focal spot B substantially coincides with the diameter of the first pyrometer segment 20.

The second pyrometer segments 21a-d, 22a-d, 23a-d, 24a-d are in each case configured as annular segments and extend in each case across an angle of 90° in the circumferential direction, that is to say in each case across a quadrant. The second pyrometer segments 21a-d, 22a-d, 23a-d, 24a-d are disposed so as to be rotationally symmetrical about the first pyrometer segment 20.

As is shown in an exemplary manner for the second pyrometer segment 21a (illustrated on the left in FIG. 3A) of the first annular region R1, the second pyrometer segments 21a-d, 22a-d, 23a-d, 24a-d that are configured as annular segments have in each case an external contour having a radially inward arcuate external edge 27a as well as a radially outward arcuate external edge 27b, said external edges 27a, 27b being connected to one another by two rectilinear external edges which extend in the radial direction.

In of the example shown in FIG. 3A, the pyrometer is configured as a segmented diode 17, and the pyrometer segments 20, 21a-d, 22a-d, 23a-d, 24a-d are formed on the surface of said diode 17 (cf. FIG. 1). In the case of a pyrometer in the form of a segmented diode 17, the circular first pyrometer segment 20 as well as the second pyrometer segments 21a-d, 22a-d, 23a-d, 24a-d can be generated with the aid of micro-structuring surface 17a of the diode 17 such that said pyrometer segments can be contacted in an electrically isolated manner. It is understood that first and second pyrometer segments 20, 21a-d, 22a-d, 23a-d, 24a-d which are also shaped differently than in FIG. 3 can be produced by micro-structured diode 17.

The monitored region 16 shown in FIG. 2 includes the focal spot B where the laser beam 3 meets the powder layer 12, the machining position $X_P$, $Y_P$ being formed in the center of said focal spot B, as well as a front portion of the melt pool S in which melted powder has formed. The thermal track having the cooled powder material adjoins the melt pool S counter to the advancing direction $V_R$, that is to say on the right in FIG. 2; said thermal track in the example shown not being situated within the part-region 16 of the machining field 8.

The temperature $T_P$ at the machining position $X_P$, $Y_P$ is typically in the magnitude of approx. 2000° C. and represents the maximum temperature of the welding process, while the temperature in the environment of the focal spot B is significantly lower, which is why the intensity of the thermal radiation 19 meeting the pyrometer 17 is also significantly lower than at the focal spot B. It can be favorable for a filter device for attenuating the thermal radiation 19 that emanates from the part-region 16, or from the machining field 8, respectively, to be disposed in the beam path between the machining field 8 and the first pyrometer segment 20 and/or at least one of the second pyrometer segments 21a-d, 22a-d, 23a-d, 24a-d.

In the case of the pyrometer in the form of the structured diode 17, filter devices of this type can be applied in the form of a coating to a few of the pyrometer segments 20, 21a-d, 22a-d, 23a-d, 24a-d. Such a filter device 26 which in the form of a coating is applied to the first, central, pyrometer segment 20 is indicated by a hatched area in FIGS. 3A and 3B. The filter device 26 serves for attenuating the thermal radiation 19 which emanates from the machining position $X_P$, $Y_P$, or the focal spot B, respectively, where the maximum intensity of the thermal radiation 19 is emitted. For this purpose, the filter device 26 can be configured as a bandpass filter which has only a small transmission for a wavelength which corresponds to the maximum emission of a black or grey body at the temperature $T_P$ of approx. 2000° C.

Filtering can accordingly also be optionally performed at the second pyrometer segments 21a-d, 22a-d, 23a-d, 24a-d. For the determination of the temperature $T_P$ at the machining position $X_P$, $Y_P$ as well as at further positions (see below) in the illustrated part-region 16 of the machining field 8 it can be favorable for the filter device 26 to be configured as a bandpass filter which is designed such that the latter transmits thermal radiation 19 at two different wavelengths which are detected separately for a respective pyrometer segment 20, 21a-d, 22a-d, 23a-d, 24a-d so as to make a direct conclusion, that is to say without any knowledge of the emissivity, pertaining to the temperature $T_P$ at the machining position $X_P$, $Y_P$ or at other positions.

Alternatively or additionally to the use of filter devices 26, the pyrometer segments 20, 21a-d, 22a-d, 23a-d, 24a-d of the structured diode 17 can also be produced from different materials, more specifically from materials which have a different wavelength-dependent sensitivity in relation to the thermal radiation 19 which emanates from the part-region 16 of the machining field 8. In the example shown in FIG. 3A, the first pyrometer segment 20 has a maximum sensitivity at a maximum wavelength $\lambda_{1MAX}$ which is adapted to the wavelength of the maximum emission of thermal radiation 19 of a black or grey body, respectively, having a temperature of approx. 2000° C. By contrast, the second pyrometer segments 21a-d in the first annular region R1 have a maximum sensitivity at a (larger) maximum wavelength $\lambda_{2MAX}$ which is adapted to the correspondingly lower temperatures of the thermal radiation 19 which meets the second pyrometer segments 21a-d in the first annular region R1. The maximum wavelength $\lambda_{1MAX}$ of the first pyrometer segment 20 is smaller than the maximum wavelength $\lambda_{2MAX}$ of the second pyrometer segments 20 in the first annular region R1. Accordingly, the pyrometer segments 22a-d in the second annual region R2 can have a maximum sensitivity, or a maximum wavelength, respectively, which is larger than the maximum wavelength $\lambda_{2MAX}$ of the second pyrometer segments 20 in the first annular region R1, etc.

Four positions $X_{P+4}$, $Y_P$, $X_{P+3}$, $Y_P$, $X_{P+2}$, $Y_P$, $X_{P+1}$, $Y_P$ which in the advancing direction $V_R$ are situated ahead of the machining position $X_P$, $Y_P$, as well as four positions $X_{P-1}$, $Y_P$, $X_{P-2}$, $Y_P$, $X_{P-3}$, $Y_P$, $X_{P-4}$, $Y_P$ which along the advancing direction (corresponding to the scanning direction) $V_R$ are situated behind the machining position $X_P$, $Y_P$, are illustrated in FIG. 2. The positions $X_{P+4}$, $Y_P$, $X_{P+3}$, $Y_P$, $X_{P+2}$, $Y_P$; $X_{P+1}$, $Y_P$ or $X_{P-1}$, $Y_P$; $X_{P-2}$, $Y_P$, $X_{P-3}$, $Y_P$, $X_{P-4}$, $Y_P$, respectively, shown in FIG. 2, more specifically the respective spacing of said positions from the machining position $X_P$, $Y_P$, in the example shown are chosen in such a manner that said positions are situated approximately in the center of the second pyrometer segments 21a, 22a, 23a, 24a (illustrated on the left in FIG. 3A), or approximately in the center of the second pyrometer segments 21c, 22c, 23c, 24c (illustrated on the right in FIG. 3A). The associated temperature $T_{P+4}$, $T_{P+3}$, $T_{P+2}$, $T_{P+1}$ for the respective position $X_{P+4}$, $X_{P+3}$, $X_{P+2}$, $X_{P+1}$, $Y_P$ ahead of the machining position $X_P$, $Y_P$ in the advancing direction $V_R$ can be determined by means of the thermal radiation 19 impinging upon the respective second pyrometer segment 21a, 22a, 23a, 34a in an evaluation device (or evaluator) 28 (cf. FIG. 1) of the irradiating device 1. The evaluator 28 includes a computing unit (e.g., one or more processors) coupled with a non-transitory computer-readable medium encoding instructions that cause the computing unit to execute the instructions, e.g., to determine the associated temperature $T_{P+4}$, $T_{P+3}$, $T_{P+2}$, $T_{P+1}$ for the respective position $X_{P+4}$, $X_{P+3}$, $X_{P+2}$, $X_{P+1}$, $Y_P$ ahead of the machining position $X_P$, $Y_P$. Accordingly, the associated temperature $T_{P-1}$, $T_{P-2}$, $T_{P-3}$, $T_{P-4}$ for a respective position $X_{P-1}$, $X_{P-2}$, $X_{P-3}$, $X_{P-4}$, $Y_P$ behind the machining position $X_P$, $Y_P$ in the advancing direction $V_R$ can also be determined by means of the thermal radiation 19 impinging upon the respective second pyrometer segment 21c, 22c, 23c, 24c in the evaluation device 28.

The evaluation device 28, based on the advancing direction $V_R$ which is predefined by the open-loop and/or closed-loop control device 29, is configured to identify those second pyrometer segments 21a, 22a, 23a, 24a which in the momentary advancing direction $V_R$ are positioned ahead of the machining position $X_P$, $Y_P$, as well as those second pyrometer segments 21c, 22c, 23c, 24c which in the momentary advancing direction $V_R$ are disposed behind the machining position $X_P$, $Y_P$. It is understood that, for example, in a rotation of the advancing direction $V_R$ by 90° in relation to the advancing direction $V_R$ shown in FIG. 3A, the second pyrometer segments 21b, 22b, 23b, 24b which are disposed above in FIG. 3A, or the second pyrometer segments 21d, 22d, 23d, 24d which are disposed below in FIG. 3A, respectively, are in each case used for the determination of the respective temperatures. Even in the case of the advancing direction $V_R$ running as illustrated in FIG. 3A, the second pyrometer segments 21b, 22b, 23b, 24b which are disposed above in FIG. 3A, or the second pyrometer segments 21d, 22d, 23d, 24d which are disposed below in FIG. 3A, respectively, can be used for the determination of temperatures, or of temperature gradients ΔT transverse, or substantially transverse in relation to the advancing direction $V_R$. This is favorable in particular in the case of a planar melting of the powder bed in which a plurality of thermal tracks are generated, said thermal tracks running so as to be mutually neighboring and parallel such that the not yet completely cooled neighboring thermal tracks can be evaluated by the evaluation device 28 in this way.

The evaluation device 28 can also be used for determining temperature gradients ΔT by means of the respective temperatures $T_{P+4}$, $T_{P+3}$, $T_{P+2}$, $T_{P+1}$, $T_P$, $T_{P-1}$, $T_{P-2}$, $T_{P-3}$, $T_{P-4}$, for example in that the difference between two of the temperatures, for example $T_{P+4}$-$T_{P+3}$, is formed and said difference is divided by the spacing A (known by virtue of the imaging scale of the imaging device 9) between the two associated positions $X_{P+4}$, $X_{P+3}$ in the machining field 8: $\Delta T = (T_{P+4}-T_{P+3})/A$.

With the aid of the open-loop and/or closed-loop control device 29, the welding process can be controlled in a closed-loop manner by means of the at least one temperature $T_{P+4}$, $T_{P+3}$, $T_{P+2}$, $T_{P+1}$, $T_P$, $T_{P-1}$, $T_{P-2}$, $T_{P-3}$, $T_{P-4}$ determined by the evaluation unit 28 and/or of a respective temperature gradient ΔT, for example in that the output P of the laser beam 3 and/or the advancing speed $V_R$ are/is set such that one or a plurality of the temperatures $T_{P+4}$, $T_{P+3}$, $T_{P+2}$, $T_{P+1}$, $T_P$, $T_{P-1}$, $T_{P-2}$, $T_{P-3}$, $T_{P-4}$, or one or a plurality of temperature gradients ΔT, respectively, are in a predefined value range. The determination of temperature gradients ΔT in particular in the region of the thermal track has proven favorable in order for the thermal history and thus the microstructure of the material structure of the three-dimensional workpiece to be determined. The closed-loop control of the welding process with the aid of the open-loop and/or closed-loop control device 29 can be performed in real time; however, it is also possible for the closed-loop control to be performed layer-by-layer, that is to say that the temperature gradient ΔT, for example in the form of the cooling rate, is determined for an entire applied powder layer 12 so as to determine how much heat is stored in the component, or in the powder bed, when melting a powder layer 12 of the powder bed. Other machining parameters can be used for melting the following powder layer 12, that is to say that the laser output P and/or the advancing speed $V_R$ can be suitably adapted, for example.

In particular in the case of the pyrometer 17 having a multiplicity of second pyrometer segments 25, the open-loop and/or closed-loop control device 29 can also serve for using the pieces of information which are delivered by the evaluation device 28 and pertain to the not yet completely cooled neighboring thermal tracks, in order for the closed-loop control of machining parameters, for example the powder P of the machining laser beam 3 and/or the advancing speed $V_R$, to be used when generating the momentary thermal track. Such a closed-loop control is not performed in real time and can therefore be easily implemented.

It is understood that the part-region 16 of the irradiating region 8 which is imaged on the pyrometer 17 by the imaging device 9 can also be larger than that is illustrated in FIG. 2 such that the thermal track situated to the right of the melt pool S in FIG. 2 is also imaged on the pyrometer 17. The diameter of the part-region 16 can vary, for example between approx. 2 mm and approx. 10 mm. The imaging device 9 can optionally be configured as a zoom lens assembly so as to implement different imaging scales.

FIG. 3B shows a further example for a pyrometer 17 in the form of a segmented diode which differs from the example shown in FIG. 3A in that the second pyrometer segments 25 are disposed in five annular regions R1 to R5 about the central first pyrometer segment 20. One hundred ninety nine second pyrometer segments 25 are disposed about the first pyrometer segment 20 the example shown in FIG. 3B, the surface areas of said second pyrometer segments 25 being in each case identical in the example shown. Subdividing the segmented diode 17 into a larger number of pyrometer segments 20, 25, in particular in the circumferential direction, is advantageous in order for the spatial resolution to be increased and for in this way avoiding that thermal radiation 19 of not yet completely cooled workpiece material or powder which has been generated in a previous welding process, respectively, influences the temperature measurement along the advancing direction $V_R$.

The segmented diode 17 shown in FIGS. 3A and 3B is distinguished by a high filling factor, a high stability by virtue of the monolithic design, as well as by the potential for implementing a multiplicity of pyrometer segments in an economical manner. Additionally to the segmented diode 17 shown in FIG. 3A, or in FIG. 3B, respectively, the pyrometer can optionally have further diodes or heat-sensitive sensors, respectively, which serve for detecting thermal radiation 19 from regions of the machining field 8 that are more remote from the machining position $X_P$, $Y_P$.

FIG. 4 shows an example of a pyrometer 17 which first differs from the pyrometer 17 shown in FIGS. 3A and 3B in that the first pyrometer segment 20 and the second pyrometer segments 21a, 21b, 22a, 22b, 23a, 23b are disposed on a common surface 30 in three annular regions R1 to R3. Moreover, the second pyrometer segments 21a, 21b, 22a, 22b, 23a, 23b extend in each case across an angular range of 180° which is sufficient for assigning the second pyrometer segments 21a, 21b, 22a, 22b, 23a, 23b to positions (not shown) ahead of or behind, respectively, the machining position $X_P$, $Y_P$, as long as the advancing direction $V_R$ does not run exactly along the border between neighboring pyrometer segments 21a, 21b, 22a, 22b, 23a, 23b. The first pyrometer segment 20 and the second pyrometer segments 21a, 21b, 22a, 22b, 23a, 23b are in each case connected to a detector in the form of a conventional diode 32, 32a, 32b, . . . by way of a radiation transporting device (or radiation transporter) 31, 31a, 31b, . . . , as this is illustrated in an exemplary manner in FIG. 4 for the first pyrometer segment 20 as well as for the two pyrometer segments 21a, 21b of the first annual region R1. The radiation transporting devices 31, 31a, 31b, . . . enable a spatially separated collection of the thermal radiation 19 that impinges upon a respective pyrometer segment 20, 21a, 21b, 22a, 22b, 23a, 23b.

The radiation transporting devices 31, 31a, 31b, . . . are suitably disposed in geometric terms so as to form light-guiding cones, or a light conductor, respectively, to the respective diode 32, 32a, 32b, . . . and can be based, for example, on reflection, total reflection, refraction, or on diffractive optics. In the example shown, optical waveguides in the form of fibers are used as radiation transporting devices 31, 31a, 31b, . . . which serve for the spatially separated collection and relaying of the thermal radiation 19 from the surface 32 to the, in this case, fiber-coupled standard diodes 32, 32a, 32b, . . . . The surface 30 on which the imaging device 9 images the thermal radiation 19 can, for example, form the end side of a multicore optical waveguide, for example in the form of a fiber bundle, the cores thereof at the end side of said cores being disposed in an annular manner about a center, as is shown in FIG. 4. The cross section shown in FIG. 4, or the end sides of the pyrometer segments 20, 21a, 21b, 22a, 22b, 23a, 23b, respectively, can be guided to the respective diode 32, 32a, 32b, . . . by way of different optical waveguides 31, 31a, 32b, . . . of the multicore optical waveguide in the form of fibers having a circular cross section, for example. The thermal radiation 19 can be directed onto the respective standard diodes 32, 32a, 32b, . . . through the optical waveguides 31, 31a, 31b, . . . .

As has been described further above in the context of FIG. 3A, the diodes 32, 32a, 32b, . . . can be formed from different materials which are adapted to the wavelength of maximum emission in the temperature range of the thermal radiation 19 that is in each case to be expected to impinge upon the respective pyrometer segments 20, 21a, 21b, 22a, 22b, 23a, 23b. For example, the diode 32 which is assigned to the first pyrometer segment 20 can have a smaller maximum wavelength $\lambda_{1MAX}$ than the maximum wavelength $\lambda_{2MAX}$ of the two diodes 32a, 32b which are assigned to the second pyrometer segments 21a, 21b which are disposed in the first annular region R1. In the example shown in FIG. 4, a higher filling factor is implemented in comparison to the use of a plurality of diodes which are disposed beside one another and which, by virtue of connectors etc., cannot be disposed so as to be directly neighboring.

What is claimed is:

1. An irradiating device for irradiating a machining field with a machining beam for carrying out a welding process, the irradiation device comprising:
    a beam scanner configured to align the machining beam along a machining beam path to a machining position in the machining field; and
    an imaging device configured to image a part-region of the machining field on a pyrometer having at least two pyrometer segments,
    wherein the imaging device is configured to
        image thermal radiation emanating from the machining position in the machining field and being aligned by the beam scanner along an observation beam path on a first pyrometer segment of the pyrometer, and
        image thermal radiation emanating from at least one position in the machining field situated ahead of or behind the machining position along an advancing direction of the machining beam in the machining field and being aligned by the beam scanner along the observation beam path on at least one second pyrometer segment of the pyrometer,
    wherein the observation beam path is at least partially coaxial with the machining beam path in an opposing direction, and
    wherein the first pyrometer segment and the at least one second pyrometer segment are associated with different responsive characteristics in relation to the thermal radiation emanating from the machining field.

2. The irradiating device of claim 1, wherein the first pyrometer segment and the at least one second pyrometer segment are formed on a surface of a structured diode.

3. The irradiating device of claim 2, wherein at least two of the pyrometer segments on the surface of the structured diode have different wavelength-dependent sensitivities in relation to the thermal radiation emanating from the machining field.

4. The irradiating device of claim 3, wherein the first pyrometer segment of the structured diode has a maximum sensitivity at a first maximum wavelength that is less than a second maximum wavelength of the at least one second pyrometer segment of the structured diode.

5. The irradiating device of claim 1, wherein each of the first pyrometer segment and the at least one second pyrometer segment is connected to a respective detector by a respective radiation transporter.

6. The irradiating device of claim 5, wherein at least two of the detectors have different wavelength-dependent sensitivities in relation to the thermal radiation emanating from the machining field.

7. The irradiating device of claim 6, wherein a first detector connected to the first pyrometer segment has a maximum sensitivity at a first maximum wavelength that is less than a second maximum wavelength of at least one second detector connected to the at least second pyrometer segment.

8. The irradiating device of claim 1, further comprising a filter disposed between the machining field and at least one of the first pyrometer segment or the at least one second pyrometer segment,
    wherein the filter is configured for wavelength-dependent attenuation of the thermal radiation emanating from the machining field.

9. The irradiating device of claim 1, wherein at least one of the first pyrometer segment or the at least one second pyrometer segment has at least one curved external edge.

10. The irradiating device of claim 1, wherein the first pyrometer segment is circular.

11. The irradiating device of claim 1, which the pyrometer has at least two second pyrometer segments configured as annular segments.

12. The irradiating device of claim 11, wherein the at least two second pyrometer segments are disposed to be rotationally symmetrical about the first pyrometer segment.

13. The irradiating device of claim 11, wherein the at least two second pyrometer segments are disposed in a plurality of concentric rings.

14. The irradiating device of claim 1, wherein the pyrometer is disposed in an observation beam path running coaxially with the machining beam.

15. The irradiating device of claim 1, further comprising:
    a loop controller configured to predefine the advancing direction in a movement of the machining beam across the machining field.

16. The irradiating device of claim 15, further comprising:
    an evaluator configured to identify at least one of second pyrometer segments disposed ahead of the machining position in the advancing direction or second pyrometer segments disposed behind the machining position in the advancing direction.

17. The irradiating device of claim 16, wherein the evaluator is configured to:
    determine a temperature at the machining position and at least one of a temperature at a position in the machining field ahead of the machining position or a temperature at a position in the machining field behind the machining position; and determine at least one temperature gradient by at least two of the temperatures.

18. The irradiating device of claim 17, wherein the loop controller is configured to regulate, based on at least one of the determined temperature gradient or at least one of the determined temperatures, at least one of an output of the machining beam in the machining field or an advancing speed.

19. A machine tool for producing three-dimensional components by irradiating powder layers by a machining beam, comprising:
- a machining chamber having a support for applying the powder layers; and
- an irradiating device configured to irradiate the powder layers in the machining chamber with the machining beam, the irradiating device comprising:
  - a beam scanner configured to align the machining beam to a machining position in a machining field in the machining chamber;
  - an imaging device configured to image a part-region of the machining field on a pyrometer having at least two pyrometer segments,
    wherein the imaging device is configured to
      image thermal radiation emanating from the machining position in the machining field on a first pyrometer segment of the pyrometer, and
      image thermal radiation emanating from at least one position in the machining field situated ahead of or behind the machining position along an advancing direction of the machining beam in the machining field on at least one second pyrometer segment of the pyrometer;
  - a loop controller configured to predefine the advancing direction in a movement of the machining beam across the machining field; and
  - an evaluator configured to identify at least one of second pyrometer segments disposed ahead of the machining position in the advancing direction or second pyrometer segments disposed behind the machining position in the advancing direction.

20. The machine tool of claim 19, wherein the irradiating device is disposed in relation to the machining chamber such that the machining field of the beam scanner in which the machining beam is focused is congruent with a position of one of the powder layers to be irradiated by the machining beam.

21. An irradiating device for irradiating a machining field with a machining beam for carrying out a welding process, the irradiation device comprising:
- a beam scanner configured to align the machining beam to a machining position in the machining field;
- an imaging device configured to image a part-region of the machining field on a pyrometer having at least two pyrometer segments,
  wherein the imaging device is configured to
    image thermal radiation emanating from the machining position in the machining field on a first pyrometer segment of the pyrometer, and
    image thermal radiation emanating from at least one position in the machining field situated ahead of or behind the machining position along an advancing direction of the machining beam in the machining field on at least one second pyrometer segment of the pyrometer;
- a loop controller configured to predefine the advancing direction in a movement of the machining beam across the machining field; and
- an evaluator configured to identify at least one of second pyrometer segments disposed ahead of the machining position in the advancing direction or second pyrometer segments disposed behind the machining position in the advancing direction.

22. The irradiating device of claim 21, wherein the evaluator is configured to:
- determine a temperature at the machining position and at least one of a temperature at a position in the machining field ahead of the machining position or a temperature at a position in the machining field behind the machining position; and
- determine at least one temperature gradient by at least two of the temperatures.

23. The irradiating device of claim 22, wherein the loop controller is configured to regulate, based on at least one of the determined temperature gradient or at least one of the determined temperatures, at least one of an output of the machining beam in the machining field and an advancing speed.

24. An irradiating device for irradiating a machining field with a machining beam for carrying out a welding process, the irradiation device comprising:
- a beam scanner configured to align the machining beam to a machining position in the machining field; and
- an imaging device configured to image a part-region of the machining field on a pyrometer having at least two pyrometer segments,
  wherein the imaging device is configured to
    image thermal radiation emanating from the machining position in the machining field on a first pyrometer segment of the pyrometer, and
    image thermal radiation emanating from at least one position in the machining field situated ahead of or behind the machining position along an advancing direction of the machining beam in the machining field on at least one second pyrometer segment of the pyrometer, and
  wherein the first pyrometer segment and the at least one second pyrometer segment are formed on a surface of a structured diode.

25. The irradiating device of claim 24, wherein the beam scanner is configured to:
- align the machining beam along a machining beam path to the machining position in the machining field,
- align the thermal radiation emanating from the machining position in the machining field along an observation beam path on the first pyrometer segment of the pyrometer, and
- align the thermal radiation emanating from the at least one position in the machining field along the observation beam path on the at least one second pyrometer segment of the pyrometer, and
wherein the observation beam path is at least partially coaxial with the machining beam path in an opposing direction.

* * * * *